United States Patent
Jerichow et al.

(10) Patent No.: US 8,850,217 B2
(45) Date of Patent: Sep. 30, 2014

(54) METHOD AND APPARATUS FOR PARENTAL CONTROL OF WIRELESS BROADCAST CONTENT

(75) Inventors: Anja Jerichow, Munich (DE); Martin Jansky, Espoo (FI); Kyösti Koivisto, Kaarina (FI); Matti Puputti, Turku (FI)

(73) Assignee: Nokia Corporation, Espoo (FI)

( * ) Notice: Subject to any disclaimer, the term of this patent is extended or adjusted under 35 U.S.C. 154(b) by 205 days.

(21) Appl. No.: 13/060,159

(22) PCT Filed: Aug. 19, 2009

(86) PCT No.: PCT/FI2009/050668
§ 371 (c)(1),
(2), (4) Date: Feb. 22, 2011

(87) PCT Pub. No.: WO2010/020710
PCT Pub. Date: Feb. 25, 2010

(65) Prior Publication Data
US 2011/0185185 A1   Jul. 28, 2011

Related U.S. Application Data

(60) Provisional application No. 61/090,543, filed on Aug. 20, 2008.

(51) Int. Cl.
| | | |
|---|---|---|
| G06F 21/00 | (2013.01) | |
| H04N 21/418 | (2011.01) | |
| H04N 21/475 | (2011.01) | |
| H04N 5/913 | (2006.01) | |
| H04N 21/643 | (2011.01) | |
| H04N 21/61 | (2011.01) | |
| H04N 21/414 | (2011.01) | |
| H04N 21/488 | (2011.01) | |
| H04N 21/438 | (2011.01) | |

(52) U.S. Cl.
CPC ..... *H04N 21/64315* (2013.01); *H04N 21/4181* (2013.01); *H04N 21/4753* (2013.01); *H04N 5/913* (2013.01); *H04N 21/4751* (2013.01); *H04N 21/6181* (2013.01); *H04N 21/41407* (2013.01); *H04N 21/4882* (2013.01); *H04N 21/4383* (2013.01)
USPC ........................................................ 713/183

(58) Field of Classification Search
CPC .. G06F 21/31; H04N 5/913; H04N 21/41407; H04N 21/4181; H04N 21/4383; H04N 21/488
USPC ........................................................ 713/183
See application file for complete search history.

(56) References Cited

U.S. PATENT DOCUMENTS 7,903,821 B2   3/2011   Zhu et al.
8,396,082 B2 *  3/2013   Hannuksela et al. ......... 370/473
(Continued)

FOREIGN PATENT DOCUMENTS

CN   1777324   5/2006

OTHER PUBLICATIONS

International Search Report and Written Opinion of the International Searching Authority for corresponding Patent Cooperation Treaty Application No. PCT/FI2009/050668 dated Nov. 11, 2009, 15 pages.
(Continued)

*Primary Examiner* — Kambiz Zand
*Assistant Examiner* — Benjamin Kaplan
(74) *Attorney, Agent, or Firm* — Nokia Corporation

(57) ABSTRACT

A method comprises detecting zapping to or from one or more services; determining whether the zapping includes termination of a password-protected service; and sending a trigger message (248, 256, 262) only if the zapping includes termination of a password-protected service (X, Y, Z). In one embodiment, the trigger message is sent to a smartcard (SC). In one embodiment, the password-protected service is password-protected for parental control. In one embodiment, the method further includes requesting a password when the zapping includes zapping to a password-protected service. In one embodiment, the password-protected service is a pincode-protected service.

20 Claims, 6 Drawing Sheets

(56) References Cited

U.S. PATENT DOCUMENTS

| | | | | |
|---|---|---|---|---|
| 2003/0158960 | A1* | 8/2003 | Engberg | 709/237 |
| 2006/0136964 | A1 | 6/2006 | Diez et al. | |
| 2007/0036102 | A1* | 2/2007 | Hwang et al. | 370/328 |
| 2008/0046575 | A1* | 2/2008 | Bouazizi | 709/228 |
| 2008/0101317 | A1* | 5/2008 | Bouazizi | 370/342 |
| 2008/0222300 | A1* | 9/2008 | Bouazizi | 709/231 |
| 2008/0301742 | A1* | 12/2008 | Hannuksela et al. | 725/105 |
| 2008/0304520 | A1* | 12/2008 | Hannuksela et al. | 370/498 |
| 2008/0313191 | A1* | 12/2008 | Bouazizi | 707/10 |
| 2009/0113471 | A1* | 4/2009 | Bouazizi et al. | 725/32 |

OTHER PUBLICATIONS

Open Mobile Alliance (OMA), Service and Content Protection for Mobile Broadcast Services, Draft Version 1.0, Jul. 24, 2008.

Open Mobile Alliance (OMA), Service and Content Protection for Mobile Broadcast Services, OMA-BCAST-2008-0338-CR_Bug_fix_for_parental_control_in_SCP.doc, Sep. 29, 2008.

Open Mobile Alliance (OMA), Service and Content Protection for Mobile Broadcast Services Doc# OMA-BCAST-2008-0382-CR_Clarification_P-I_Parameter_with_P1_based_on_FF Change Request, 2006.

Office Action received for corresponding Chinese Application No. 09815741.5-1858, dated Sep. 23, 2013, 10 pages.

Office Action received for corresponding Eurpoean Application No. 09807955.1-1908, dated Jul. 30, 2013, 4 pages.

International Search Report received for corresponding Patent Cooperation Treaty Application No. PCT/FI2009/050668, dated Nov. 11, 2009, 5 pages.

Open Mobile Alliance (OMA), Service and Content Protection for Mobile Broadcast Services, Draft Version 1.0, 24 Jul. 2008, pp. 66-68, 91-94.

Written Opinion received for corresponding Patent Cooperation Treaty Application No. PCT/FI2009/050668, dated Nov. 11, 2009, 7 pages.

International Preliminary Report on Patentability received for corresponding Patent Cooperation Treaty Application No. PCT/FI2009/050668, dated Nov. 11, 2009, 8 pages.

Supplementary European Search Report and Search Opinion for corresponding European Patent Application No. EP09807955, dated Mar. 28, 2012, 1 page.

Office Action for for corresponding Chinese Patent Application No. 20090123499.2, dated Jan. 28, 2013, 20 pages.

"Bug fix for parental control in SCP", Aug. 9, 2008, retrieved from Internet: URL:://member.openmobilealliance.org/ftp/Public_documents/bcast/2008/OMA-BCAST-2008-0338-CR_Bug_fix_for_parental_control_in_SCP.zip pp. 1-3.

Office Action received for corresponding Chinese Application No. 200980123499.2, dated Feb. 8, 2014, 9 pages.

\* cited by examiner

METHOD AND APPARATUS FOR PARENTAL CONTROL OF WIRELESS BROADCAST CONTENT

RELATED APPLICATION

This application was originally filed as PCT Application No. PCT/FI2009/050668 filed Aug. 19, 2009, which claims priority benefit from U.S. Provisional Patent Application No. 61/090,543, filed Aug. 20, 2008.

FIELD OF INVENTION

This invention relates to wireless broadcast services. In particular, the present invention relates to parental control of such wireless broadcast services.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The Open Mobile Alliance Mobile Broadcast Services (OMA BCAST) Enabler 1.0 addresses functional areas which are generic enough to be common to many broadcast services, and which can be defined and implemented in a bearer-independent way. These functional areas include service guide, file distribution, stream distribution, service protection, content protection, service interaction, service provisioning, terminal provisioning and notification, and jointly enable mobile broadcast services.

The OMA Service and Content Protection for Mobile Broadcast Services specification, which is hereby incorporated by reference, specifies how the parental control requesting and processing should be done. In case of a smartcard profile, a pincode is asked when entering a pincode-protected service. Zapping between multiple services should result in a re-entering of such pincode.

SUMMARY OF THE INVENTION

In one aspect of the invention, a method comprises detecting zapping to or from one or more services; determining whether the zapping includes termination of a password-protected service; and sending a trigger message only if the zapping includes termination of a password-protected service. In one embodiment, the trigger message is sent to a smartcard. In one embodiment, the password-protected service is password-protected for parental control. In one embodiment, the method further includes requesting a password when the zapping includes zapping to a password-protected service. In a further embodiment, the password-protected service is a pincode-protected service. In one embodiment, an instance of each service is running on one or more applications. A trigger message may be sent only if the zapping includes termination of all instances of the password-protected service.

In one aspect of the invention, a method comprises receiving a trigger message only when a zapping includes termination of a password-protected service; and causing a password to be requested upon detecting a zapping to a password-protected service. In one embodiment, the trigger message is received from a user terminal application. In one embodiment, the password-protected service is password-protected for parental control. In a further embodiment, the password-protected service is a pincode-protected service. In one embodiment, an instance of each service is running on one or more applications. A trigger message may be received only if the zapping includes termination of all instances of the password-protected service.

In another aspect, an apparatus comprises a processor and a memory unit communicatively connected to the processor. The memory unit includes computer code for detecting zapping to or from one or more services; computer code for determining whether the zapping includes termination of a password-protected service; and computer code for sending a trigger message only if the zapping includes termination of a password-protected service. In one embodiment, the password-protected service is a pincode-protected service.

In another aspect, an apparatus comprises a processor and a memory unit communicatively connected to the processor. The memory unit includes computer code for receiving a trigger message only when a zapping includes termination of a password-protected service; and computer code for causing a password to be requested upon detecting a zapping to a password-protected service. In one embodiment, the password-protected service is a pincode-protected service.

In another aspect, the invention relates to a computer program product embodied on a computer-readable medium. The computer program product comprises computer code for detecting zapping to or from one or more services; computer code for determining whether the zapping includes termination of a password-protected service; and computer code for sending a trigger message only if the zapping includes termination of a password-protected service. In one embodiment, the password-protected service is a pincode-protected service.

In another aspect, the invention relates to a computer program product embodied on a computer-readable medium. The computer program product comprises computer code for receiving a trigger message only when a zapping includes termination of a password-protected service; and computer code for causing a password to be requested upon detecting a zapping to a password-protected service. In one embodiment, the password-protected service is a pincode-protected service.

These and other advantages and features of various embodiments of the present invention, together with the organization and manner of operation thereof, will become apparent from the following detailed description when taken in conjunction with the accompanying drawings.

BRIEF DESCRIPTION OF THE DRAWINGS

Example embodiments of the invention are described by referring to the attached drawings, in which.

DETAILED DESCRIPTION OF THE VARIOUS EMBODIMENTS

In the following description, for purposes of explanation and not limitation, details and descriptions are set forth in order to provide a thorough understanding of the present invention. However, it will be apparent to those skilled in the art that the present invention may be practiced in other embodiments that depart from these details and descriptions.

As noted above, the Open Mobile Alliance (OMA) BCAST Enabler 1.0 addresses functional areas which are generic enough to be common to many broadcast services, and which can be defined and implemented in a bearer-independent way. These functional areas include service guide, file distribution, stream distribution, service protection, content protection, service interaction, service provisioning, terminal provisioning and notification, and jointly enable mobile broadcast services.

The service protection and content protection systems, and affiliated mechanisms, which support various business models of OMA BCAST enabled mobile broadcast services delivery are specified in the OMA BCAST specification. On behalf of broadcast service providers and content providers, means are provided to protect the access to, and control the consumption of, broadcast content in either streaming or file delivery format. Two main systems can be used to provide service protection and/or content protection: the DRM Profile and the smartcard profile. Both profiles are based on the 4-layer Model.

The 4-layer model key hierarchy is as follows. Layer 1 relates to authentication and registration. In Layer 1, a user device is authenticated and registered for a service. The authentication is based on shared secret key or on public key certificate unique to device.

Layer 2 relates to access authorization. A service-specific, but not device-specific, access key is delivered to each authorized device. The access key is encrypted for each device separately using device-specific keys. Systems supporting content protection specify rules controlling content usage and distribution after delivery.

Layer 3 relates to protection of content encryption keys. Devices receive data from which content encryption keys can be derived. Only devices in possession of a service access key are able to derive content encryption keys.

Layer 4 relates to delivery of encrypted content. Service content is delivered to the devices and is encrypted by content encryption keys. Typically, content encryption keys change frequently.

Figure 1:
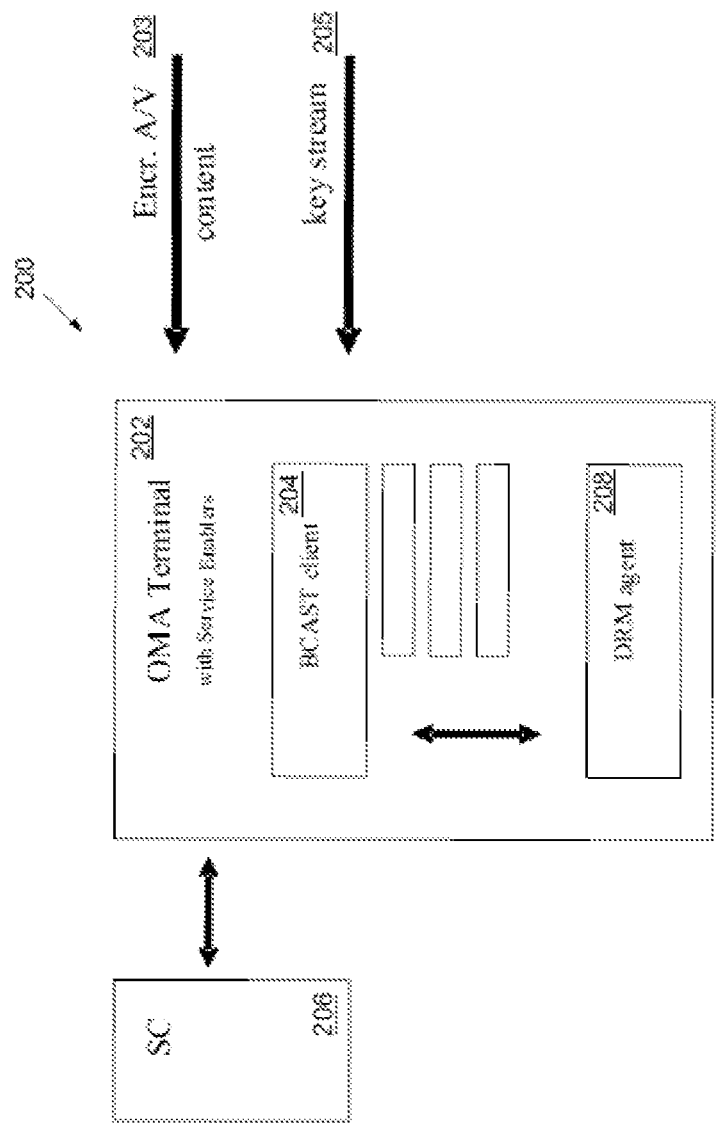
FIG. 1 is an illustration of a BCAST client receiving content and key stream.

FIG. 1 illustrates an exemplary arrangement 200 for communication of broadcast content. In accordance with the example of FIG. 1, an OMA-compliant terminal 202 includes an OMA BCAST-compliant client 204 configured to receive a content stream 203 and a key stream 205. The BCAST client 204 is configured to communicate with either a smartcard 206 (in case of a smartcard profile being used) or a digital rights management (DRM) agent 208 (in case of a DRM profile being used).

If the OMA compliant terminal 202 receives the key stream 205, depending on which profile is used, the processing takes place between the BCAST client 204 and the DRM agent 208 (in the case of a DRM profile) or between the BCAST client 204 and the smartcard 206 (in the case of a smartcard profile).

Fundamental components of the service and content protection systems comprise various content encryption mechanisms, protection signaling, and key management related messages which may carry rights objects, other post-reception consumption attributes (such as recording permission), key material, and parental rating criteria. In addition to server-client (or network-to-terminal) interactions, the server-side interfaces pertaining to service and content protection may also be specified.

Certain embodiments of the present invention relate to the use of a smartcard profile. Smartcard-based technologies and mechanisms, which provide key establishment and key management, as well as permission and token handling for the service and content protection solution for BCAST terminals may be used. In particular, subscriber key establishment and both short- and long-term key management may be based on Generic Bootstrapping Architecture (GBA) mechanisms and a smartcard.

The smartcard profile is based on an existing security framework for service protection defined for broadcast/multicast services based on smartcards defined by Third Generation Partnership Project (3GPP) Multimedia Broadcast Multicast Service (MBMS) and may include the key provisioning mechanism defined for 3GPP2 Broadcast and Multicast Service (BCMCS). The solution requires an interactive channel to obtain key material.

Variants of the smartcard profile include the (U) SIM Smartcard Profile and the (R) UIM/CSIM Smartcard profile. The two variants differ in the way that the Layer 1 key(s) are established but are otherwise the same (Layers 2, 3 and 4).

Figure 2:
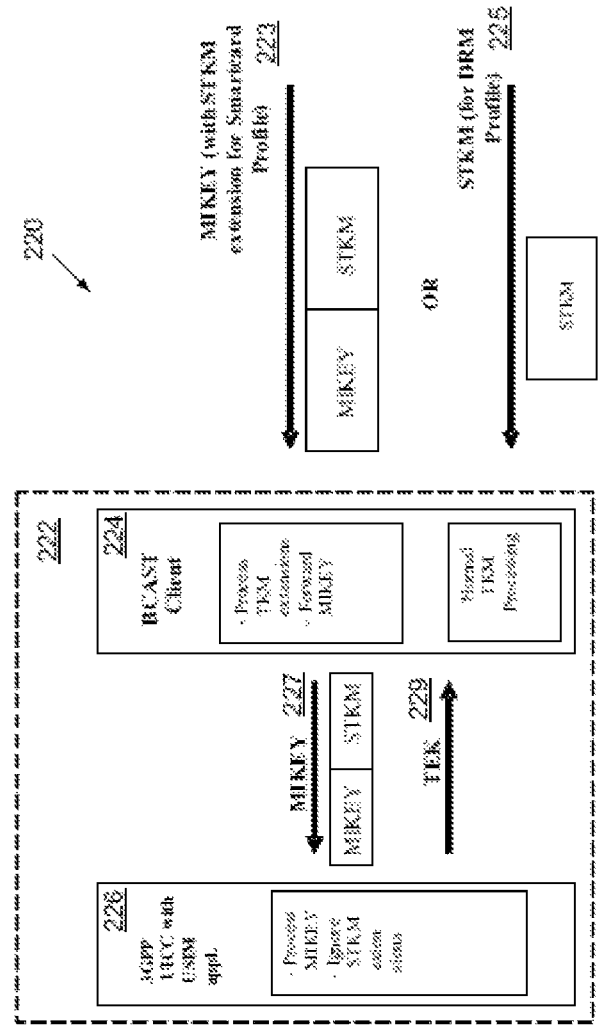
FIG. 2 is an illustration of the STKM processing by the BCAST client.

Certain embodiments of the present invention are related to Layer 3 and Layer 4 issues. In this regard, FIG. 2 illustrates an exemplary arrangement 220 for key processing. In accordance with the illustration of FIG. 2, Short Term Key Message (STKM) 223 is processed by a BCAST client 224 in order to get a traffic encryption key (TEK) from a smartcard 226. The terminal 222 receives a Multimedia Internet KEYing (MIKEY) STKM message 223, processes traffic key message (TKM) extensions and forwards the STKM message to the smartcard 226. When the smartcard 226 receives a MIKEY message 227, the smartcard 226 first determines the type of message by examining the MIKEY General Extension payload(s) present in the message. In one embodiment, upon reception of the STKM, a secure function in the smartcard 226 first retrieves, from the EXT MBMS payload, a Key Domain ID and the Service Encryption Key/Program Encryption Key identification (SEK/PEK ID), which are used to retrieve the SEK/PEK that is required to process the STKM. A corresponding procedure may be provided for use with a DRM profile 225.

Among other checks, the secure function in the smart card 226 may check the presence of access criteria in the message and may check whether the access criteria conditions are met using internal information. The internal information may depend on the type of the access criteria. For example, the current version of the OMA BCAST specification defines access criteria for parental control and location-based restriction.

If the STKM has been successfully processed, the smartcard may return the TEK to the terminal (reference 229). The TEK may be used to decrypt the TEK-encrypted audiovisual or multimedia content broadcast by the service provider.

Embodiments of the present invention improve behavior in cases where parental-controlled access is necessary, as may be the case for adult-only content or content directed at individuals above a certain age limit.

In one embodiment, if a user wants to access a parental-control, password-protected service, parental control access criteria may be set. The password is, in one embodiment, a pincode. The enforcement of the parental control may be divided into several processing phases, such as the following exemplary phases:

Check the rating_value transmitted in the STKM against the level_granted stored in the smartcard for the $rating_{13}$ type;

Check if the PINCODE has been verified;

Request a PINCODE if necessary (a PINCODE provided by the user may be checked against the PINCODE stored in the smartcard); and Unblock a locked Parental Control PINCODE, if applicable.

If the parental_control access criteria are transmitted in the STKM and if the secure function is in the smartcard, parental-control enforcement may be performed by the smartcard.

The OMA BCAST specification specifies how the parental control requesting and processing should be done. In the case of a smartcard profile, a pincode must be requested when entering a pincode-protected service. Zapping between two or more services should result in a re-entering of any pincode. As used herein, "zapping" includes switching between various broadcast services. In OMA "zapping to" refers to switching to a service, while "zapping from" or "zapping out of" refers to switching from a service.

Various solution have been proposed to address issues related to switching between two or more services. One particular proposed solution allows a user to select a PIN-protected channel (Channel X) by entering a PIN. The user may then switch to a "free" channel where no PIN is required. The user may then zap back to Channel X without entering a PIN. In accordance with the OMA BCAST specification, zapping is a function on the terminal, while the parental control function is located on the smartcard. Thus, the smartcard does not know when the terminal zaps to another service. While regulations in some countries (e.g., France) require that the PIN be requested at this point, this solution bypasses this requirement, since the smartcard is not made aware of the change to a non-protected channel.

However, this proposed solution is only applicable to cases in which the terminal is incapable of receiving multiple services simultaneously. For a good user experience, zapping signaling should be service-specific. In some cases, a terminal may have several services open at once. For example, a user may be recording one service Z (application 2) and, at the same time, be watching a different service Y (application 1), where both services are protected by parental control. If this context information is not signaled to the smartcard together with a trigger, then the smartcard may not know which service should be continued to be decrypted and which to challenge when the next STKM arrives.

Other use cases with simultaneous use of multiple services include the case where the terminal is a hub providing services to a number of devices, which in one embodiment may be connected to the terminal via a local network. The local network may be in various embodiments wireless, wired or a combination of these. For example, one service may be consumed on the terminal, while another service, for example a television program is forwarded to a rendering device, and still another service, for example an audio program is forwarded to a storing device.

Embodiments of the present invention provide manners for making a smartcard request the PIN when the user zaps between a protected service and a free-to-air channel in the context where the terminal is receiving multiple services simultaneously. In particular, embodiments of the present invention facilitate the smartcard to request the PIN only when entering to a protected service, and to avoid requesting a PIN if the reception of a protected service was stopped, while the reception of another protected service still continues.

In accordance with the above-noted proposed solution, the terminal can signal to the smartcard that a zapping has occurred. This is done by introducing a new submode of the BCAST command to send a message (referred to herein as a "trigger") to the smartcard, by which the smartcard then knows, that an encrypted channel was exited and, if returning to this channel, the parental control pincode needs to be re-entered.

The above-noted proposed solution proposes a way for the terminal to signal the smartcard parental control function that a zapping has occurred. Specifically, a BCAST COMMAND is proposed to implement this feature. The command, as in the current OMA BCAST specification, has three modes: SPE audit mode, SPE record signaling mode, and recording audit mode. The above-noted proposed solution proposes the addition of a fourth mode: Zapping signaling mode. This fourth mode allows the terminal to inform the smartcard parental control function that a zapping has occurred. It is implemented as a trigger when the information is sent from the terminal to the smartcard with no input or output data.

Another issue may occur with parental control functionality when a user zaps quickly. Specifically, if the user is quick enough, he may come back to the first channel before the end of the crypto-period. In this case, as the smartcard would refuse the STKM (due to anti-replay mechanism), the terminal would have to use the TEK from the previously submitted STKM. But doing so, it would not ask the pin-code. This would imply that the content would be displayed with no pin-code verification during the remaining duration of the crypto-period. In accordance with the proposed solution, in this specific case, handsets must submit twice the same STKM. Thus, a smartcard must authorize an STKM TS that is equal to the previous one.

The above-noted proposed solution has many shortcomings. It does not consider the use case of supporting multiple services usage at the same time. Further, with quick zapping, ambiguous behavior is introduced, because if no zapping occurred, but rather an attack, the introduced "equal" will give the wrong result.

In accordance with embodiments of the present invention, an input parameter in a trigger message is provided, and the use case of quick-zapping is captured.

In one embodiment of the present invention, it is only necessary to send the trigger message when leaving a password-protected channel, but not when leaving a free-to-air channel that is not password protected. Use of the trigger message indicates that the next time the user zaps to this channel (switches back to this service), the smartcard has to request a password, which may be, in one embodiment, a pincode.

In one embodiment of the present invention, the input for the trigger message is an MBMS Service Key (MSK) identifier (ID). The MSK ID may be sent to the terminal only if a pincode-protected STKM stream is received.

Thus, in one example, a server broadcasts multiple pincode-protected services (e.g. X,Y,Z) and other free services (e.g. A,B) for receipt by a terminal, such as a handset. The MSK IDs for the different services may be as indicated in Table 1 below, which provides an exemplary mapping of encrypted services X,Y,Z to MSK IDs:

TABLE 1

| Service name | Indication, if applicable |
|---|---|
| Service X | MSK ID 18 |
| Service Y | MSK ID 10 |
| Service Z | MSK ID 40 |
| Service A | None (free to air service) |
| Service B | None (free to air service) |

Figure 3:
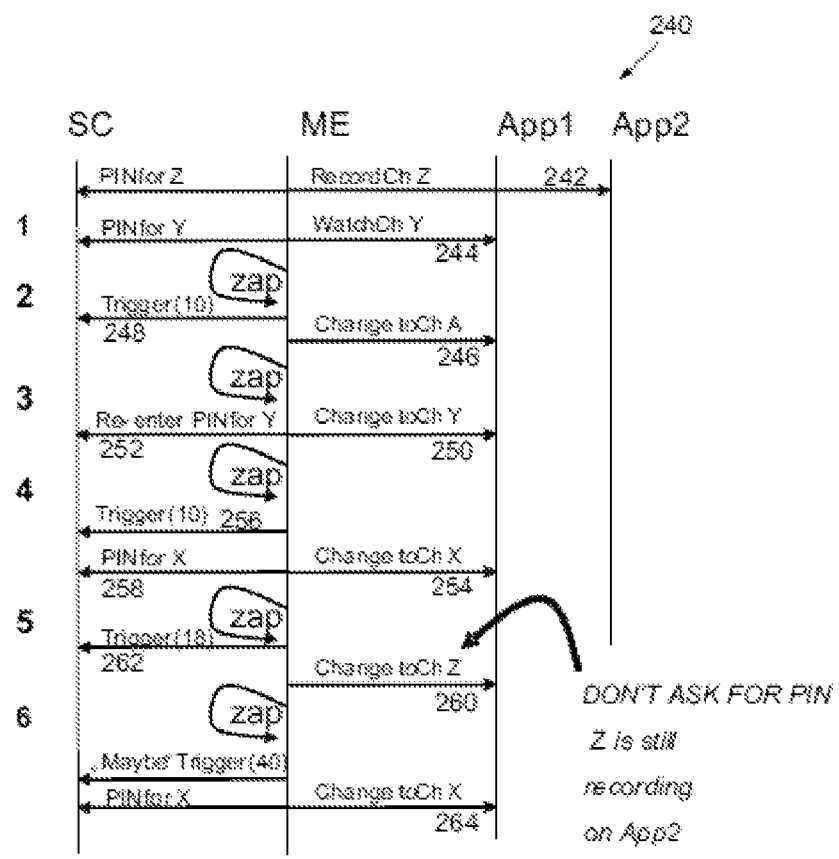
FIG. 3 illustrates the signaling for the example case in accordance with embodiments of the present invention.

An example implementation of an embodiment of the present invention will be described with reference to FIG. 3, which illustrates the signaling for the example case in accordance with embodiments of the present invention. At Step 1, a user on a terminal, such as mobile equipment (ME), initiates the terminal to record service Z (242), being run on Application 2, and to receive service Y, being run on Application 1, for viewing (244) at the same time. The user is required to enter pincode information for both channels since both are pincode-protected. While service Z is being recorded, service Y is being viewed.

At step 2, the user decides to zap from service Y to the free-to-air channel A (246). The terminal sends a trigger message 10 to the smartcard (SC) (248) to indicate that the pincode-protected channel Y has been exited. Since A is a free channel, no pincode is required. Application 2, on which service Z is not touched, also does not require entering of a pincode.

At step 3, the user decides to zap from channel A back to the pincode-protected service Y (250). The terminal does not send any trigger message. As noted above, in accordance with embodiments of the present invention, a trigger message is only sent when a pincode-protected service is exited. As step 3, the smartcard detects the start of the service Y, as the terminal starts sending STKM messages of service Y. Since service Y is PIN protected, the smartcard directs the terminal to request that the user enter a PIN (252). Service Z is not touched and, therefore, no pincode is required for service Z.

At step 4, the user zaps from service Y to service X (254), both of which are pincode-protected services. A trigger message 10 is sent to the smartcard (256). Since service X is PIN protected, as soon as the smartcard receives STKMs of service X, it requests that a PIN to be entered (258). Again, since service Z is not touched, no pincode is requested for that service.

At step 5, the user decides to see how far the Z program recording has progressed and zaps, on application 1, from service X to service Z (260). Since pincode-protected service X is being exited, a trigger message 18 is sent to the smartcard (262), indicating that the reception of service X was stopped. The smartcard determines that service Z has not been stopped and that a pincode was already provided for service Z at step 1. Therefore, no pincode is requested for service Z.

At step 6, after checking the progress of recording service Z, the user switches, in application 1, from service Z to service X (264). A pincode for watching X is requested to be entered since service X was exited at step 5. For service Z, depending on the terminal behavior, there are two possibilities.

In a first possibility the terminal does not send a trigger message since the reception of service Z was not exited or stopped. Specifically, only application 1 exited service Z, while application 2 continued to receive and record service Z. The pincode to Z needs not be entered because zapping from X to Z was done in application 1. Application 2 did not change.

In a second possibility, the terminal sends a trigger message 40, and the smartcard understands that the service Z was stopped. However, as the application 2 continues reception of service Z, the terminal continues sending STKMs of service Z to the smartcard. As soon as the next STKM of service Z is sent to the smartcard, the smartcard requests the pincode for the service Z.

This behavior depends on the implementation by the terminal and/or the requirements in the standard. An intelligent terminal may be configured to decide that, though the application 1 stopped the reception of service Z, there still is another application (application 2) which continues the reception of service Z. As a result, the terminal would not send any trigger message for service Z.

Table 2 below summarizes the state of each application and the pincode requirements at each step of FIG. 3.

TABLE 2

| Step | Service (application 1) | Enter pincode | Service (application 2) | Enter pincode |
|---|---|---|---|---|
| 1 | Y | Yes | Z | Yes |
| 2 | A | No | Z | No |
| 3 | Y | Yes | Z | No |
| 4 | X | Yes | Z | No |
| 5 | Z | No | Z | No |
| 6 | X | Yes | Z | Yes/No |

In various embodiments of the present invention, implementation may take place by a message sent between the terminal and the smartcard. This message may be the message referred to as BCAST command and is already available in the OMA BCAST specification. The submode 0x04 is enhanced in accordance with embodiments of the present invention, including the MSK ID (in the tables called SEK/PEK ID Key Number Part) as input data. The processing behavior of the smartcard is described below. The terminal and the smartcard process the request and answer accordingly. The following shows the details to the BCAST command submode "Zapping signalling mode".

In accordance with an embodiment of the present invention, the terminal uses this submode of the OMA BCAST command to notify the smartcard of the event of zapping from a pincode-protected channel to another channel. The terminal sends the BCAST command using the mechanisms described in section E.2.1 of the OMA BCAST specification.

In accordance with embodiments of the present invention, if the terminal is leaving a protected channel, the terminal may send, as input data, the MSK ID of the protected channel it is leaving. The smartcard terminates only the crypto session that is related to the particular service indicated by the MSK ID (also referred to as SEK/PEK key number part ID). In various embodiments, the terminal may keep track of the MSK IDs that it sent to the smartcard. In case more than one pincode-protected application exists with the same MSK ID, but only one of these services is terminated, the terminal may decide not to send the MSK ID to the smartcard.

In accordance with embodiments of the present invention, if the terminal is leaving a free-to-air channel, no MSK ID is available because of the free service. In this case parameter P1 is set to 'FF', which is specified in section E.2.1 of the OMA BCAST specification and represents "no input data".

At the reception, the MSK ID parameter, sent in the trigger message, indicates to the smartcard, that a crypto period for one service has stopped. In case the smartcard receives the MSK ID and the smartcard has not stored the MSK ID, the smartcard stores the MSK ID. The parameter tells which service is stopped and returns the status code "Successful".

In case the Smartcard receives the MSK ID and the Smartcard has already stored the MSK ID, the smartcard returns the status code "Pincode required" tag (0x08) to the terminal, which then initiates the parental access criteria process.

If P1 indicates "no input data", there is no input and no output (Le=0 is requested in order to return a valid case 2 command).

If P1 indicates "First block of data", the input is the MSK ID (referred to as SEK/PEK ID key number part), which may be carried in plain text part of the STKM header of the service that the terminal is leaving (i.e., is zapping from). The output is OMA BCAST Operation Response for Parental Control Operation (see table 72 of Annex E1.1.2 of the OMA BCAST specification).

If P1 indicates "First block of response data" or "Next block of response data, there is no input, and the output is BCAST Operation Response for Parental Control Operation (see table 72 of SPCP Annex E1.1.2 of the OMA BCAST specification).

If the P2 parameter in the OMA BCAST Command is '04': Zapping Signalling mode, the command parameters may be coded as follows in one embodiment.

If P1 indicates "First block of response data" or "Next block of response data" or "No input data", then the Input Data field is absent.

If P1 indicates "First block of data", then the coding provided in Table 3 below holds.

TABLE 3

Coding when P1 indicates "First block of data"

| Byte(s) | Description | Coding | M/O | Length |
|---|---|---|---|---|
| 1 | Zapping Mode Data Object tag ('73') | As defined in TS 31.101 [3GPP TS 31.101 v6] for BER-TLV data object | M | 1 |
| 2 to 1 + A bytes (A ≤ 4) | Zapping Mode Data Object length (L1) | As defined in TS 31.101 [3GPP TS 31.101 v6] for BER-TLV data object | M | A |
| A + 2 to A + 6 | SEK/PEK ID Key Number part TLV (also called MSK ID) See Table 4 below | See below | M | 4 |

TABLE 4

Coding of SEK/PEK ID Key Number Part TLV

| SEK/PEK ID Key Number part Tag | '83' | M | 1 |
|---|---|---|---|
| Length | 2 | M | 1 |
| SEK/PEK ID Key Number part | Coded as defined in 3GPP TS 33.246 [3GPP TS 33.246 v7] | M | 2 |

If P1 indicates "First block of data", "First block of response data" or "Next block of response data" the following holds for the OMA BCAST Operation Response: the same coding as for the OMA BCAST Operation Response for Parental Control Operation (see table 72 of SPCP Annex E1.1.2 of the OMA BCAST specification) applies.

Thus, embodiments of the present invention make the inclusion of a zapping trigger user-friendly. Further, certain embodiments enable receiving pincode-protected services in parallel. If zapping takes place at only one of the services, the pincode does not need to be re-entered for the other services.

While "parental control" is referred to in describing various embodiments, those skilled in the art will understand that embodiments are not limited to such applications and that various other applications are contemplated within the scope of the present invention. Similarly, while "pincode" and "pincode-protection" are referred to in describing the various embodiments, those skilled in the art will understand that embodiments are not limited to such applications.

Figure 4:
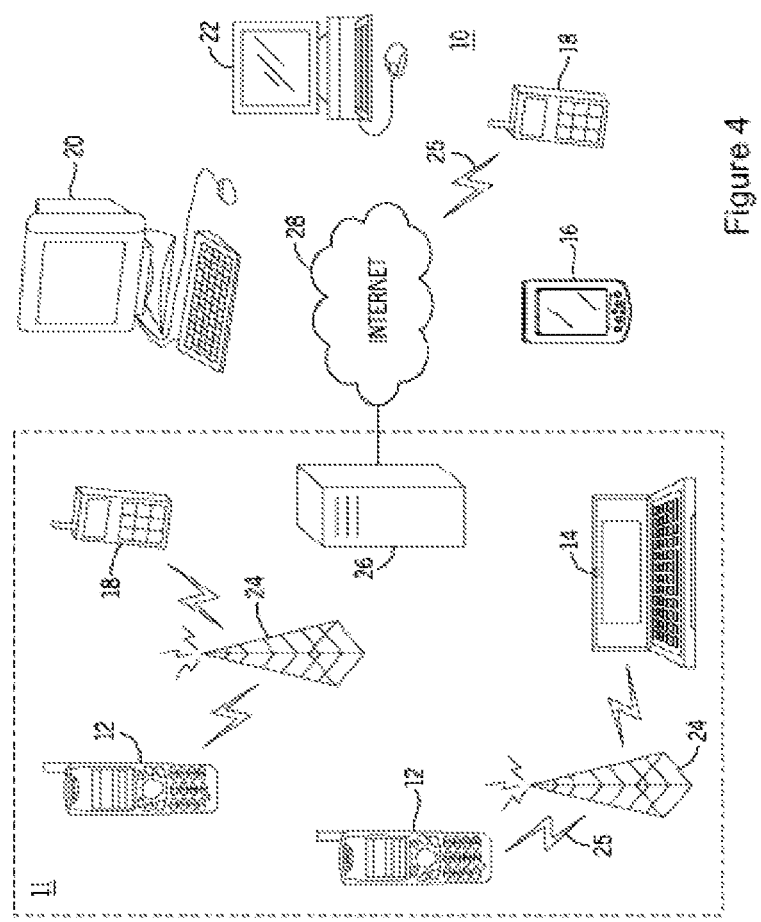
FIG. 4 is an overview diagram of a system within which various embodiments of the present invention may be implemented.

FIG. 4 shows a system 10 in which various embodiments can be utilized, comprising multiple communication devices that can communicate through one or more networks. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 4 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The example communication devices of the system 10 may include, but are not limited to, an electronic device 12 in the form of a mobile telephone, a combination personal digital assistant (PDA) and mobile telephone 14, a PDA 16, an integrated messaging device (IMD) 18, a desktop computer 20, a notebook computer 22, etc. The communication devices may be stationary or mobile as when carried by an individual who is moving. The communication devices may also be located in a mode of transportation including, but not limited to, an automobile, a truck, a taxi, a bus, a train, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types. Further, the communication devices of the system may communicate with service providers through digital broadcast networks.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device involved in implementing various embodiments of the present invention may communicate using various media including, but not limited to, radio, infrared, laser, cable connection, and the like.

Further, transmission technologies that utilize digital broadband broadcast technologies are, for example DVB-H (or next generation DVB-H2) networks or DVB-T (or next generation DVB-T2) networks. Examples of other digital broadcast standards include Digital Video Broadcast—Terrestrial (DVB-T), Integrated Services Digital Broadcasting—Terrestrial (ISDB-T), Advanced Television Systems Committee (ATSC) Data Broadcast Standard, Digital Multimedia Broadcast-Terrestrial (DMB-T), Terrestrial Digital Multimedia Broadcasting (T-DMB), Satellite Digital Multimedia Broadcasting (S-DMB), Forward Link Only (FLO), Digital Audio Broadcasting (DAB), and Digital Radio Mondiale (DRM). Other digital broadcasting standards and techniques, now known or later developed, may also be used and are contemplated within the scope of the present invention. Various embodiments of the present invention may also be applicable to other multicarrier digital broadcast systems such as, for example, T-DAB, T/S-DMB, ISDB-T, and ATSC, proprietary systems such as Qualcomm MediaFLO/FLO, and non-traditional systems such 3GPP MBMS (Multimedia Broadcast/Multicast Services) and 3GPP2 BCMCS (Broadcast/Multicast Service).

Figure 5:
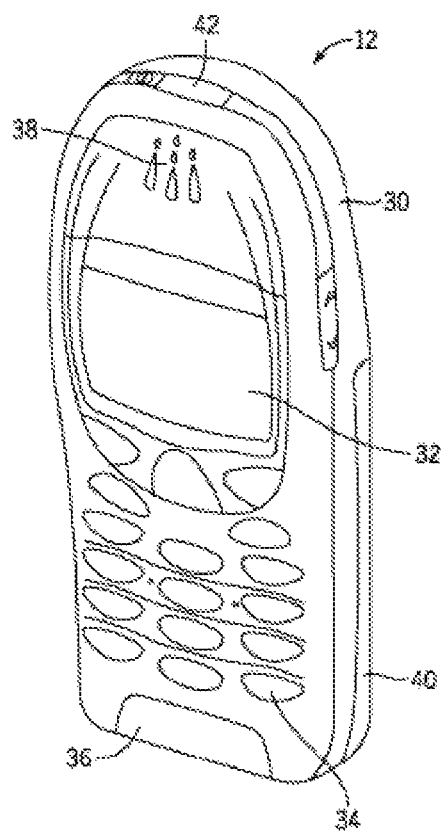
FIG. 5 illustrates a perspective view of an example electronic device which may be utilized in accordance with the various embodiments of the present invention.
Figure 6:
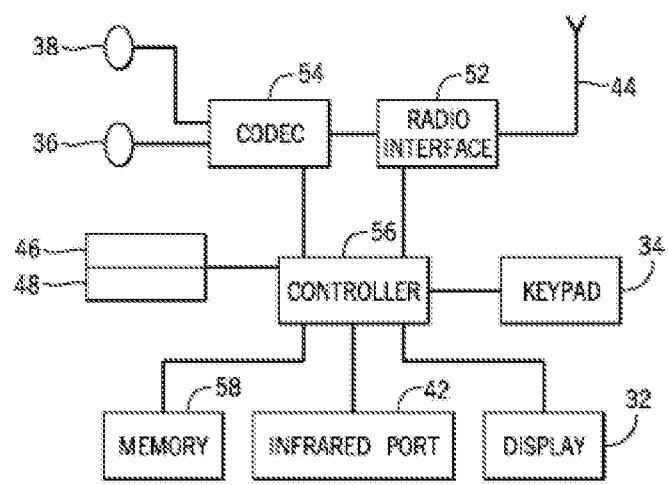
FIG. 6 is a schematic representation of the circuitry which may be included in the electronic device of FIG. 5.

FIGS. 5 and 6 show one representative electronic device 28 which may be used as a network node in accordance to the various embodiments of the present invention. It should be understood, however, that the scope of the present invention is not intended to be limited to one particular type of device. The electronic device 28 of FIGS. 5 and 6 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment, a card reader 48, radio interface circuitry 52, codec circuitry 54, a controller 56 and a memory 58. The above described components enable the electronic device 28 to send/receive various messages to/from other devices that may reside on a network in accordance with the various embodiments of the present invention. Individual circuits and elements are all of a type well known in the art, for example in the Nokia range of mobile telephones.

Various embodiments described herein are described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Embodiments of the present invention may be implemented in software, hardware, application logic or a combination of software, hardware and application logic. The software, application logic and/or hardware may reside, for example, on a chipset, a mobile device, a desktop, a laptop or a server. Software and web implementations of various embodiments can be accomplished with standard programming techniques with rule-based logic and other logic to accomplish various database searching steps or processes, correlation steps or processes, comparison steps or processes and decision steps or processes. Various embodiments may also be fully or partially implemented within network elements or modules. It should be noted that the words "component" and "module," as used herein and in the following claims, is intended to encompass implementations using one or more lines of software code, and/or hardware implementations, and/or equipment for receiving manual inputs.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method, comprising:
    simultaneously receiving a plurality of services at a terminal from a server;
    detecting zapping from one or more of the received services;
    determining whether the zapping includes termination of a password-protected service; and
    sending, from the terminal to a smartcard, a trigger message if the zapping includes termination of the password-protected service, wherein the trigger message comprises a service identifier indicating the password-protected service.

2. The method of claim 1, wherein the trigger message is sent to a smartcard.

3. The method of claim 1, wherein the password-protected service is password-protected for parental control.

4. The method of claim 1, further comprising:
    requesting a password when the zapping includes zapping to the password-protected service, wherein the password-protected service is a pincode-protected service.

5. The method of claim 1, wherein an instance of each service is running on one or more applications and wherein a trigger message is sent if the zapping includes termination of all instances of the password-protected service.

6. A method, comprising:
    receiving, at a smartcard, a trigger message from a terminal when a zapping includes termination of a password-protected service, wherein the trigger message comprises a service identifier indicating the password-protected service; and
    causing a code to be requested upon detecting a zapping to the password-protected service.

7. The method of claim 6, wherein the trigger message is received from a user terminal application.

8. The method of claim 6, wherein the password-protected service is at least one of password-protected for parental control and pincode-protected service.

9. The method of claim 6, wherein an instance of each service is running on one or more application; and wherein a trigger message is received if the zapping includes termination of all instances of the password-protected service.

10. An apparatus, comprising:
    a processor; and
    a memory unit communicatively connected to the processor and including:
    computer code configured to receive simultaneously a plurality of services from a server;
    computer code configured to detect zapping from one or more of the received services;

computer code configured to determine whether the zapping includes termination of a password-protected service; and computer code configured to send a trigger message to a smartcard if the zapping includes termination of the password-protected service, wherein the trigger message comprises a service identifier indicating the password-protected service.

11. The apparatus of claim 10, wherein computer code configured to send a trigger message includes computer code to send a trigger message to a smartcard.

12. The apparatus of claim 10, wherein the password-protected service is at least one of a password-protected for parental control and a pincode-protected service.

13. The apparatus of claim 10, wherein the memory unit further includes:

computer code configured to request a password when the zapping includes zapping to the password-protected service.

14. The apparatus of claim 10, wherein an instance of each service is running on one or more applications; and wherein the computer code configured to send a trigger message includes computer code configured to send the trigger message if the zapping includes termination of all instances of the password-protected service.

15. An apparatus, comprising:
a processor; and
a memory unit communicatively connected to the processor and including:
  computer code configured to receive a trigger message when a zapping includes termination of a password-protected service, wherein the trigger message is received from a user terminal application, and wherein the trigger message comprises a service identifier indicating the password-protected service; and
  computer code configured to cause a password to be requested upon detecting a zapping to the password-protected service.

16. The apparatus of claim 15, wherein the password-protected service is at least one of a password-protected for parental control and a pincode-protected service.

17. A computer program product, embodied on a non-transitory computer-readable medium, comprising:
  computer code configured to simultaneously receive a plurality of services at a terminal from a server;
  computer code configured to detect zapping from one or more of the received services;
  computer code configured to determine whether the zapping includes termination of a password-protected service; and
  computer code configured to send a trigger message to a smartcard if the zapping includes termination of a password-protected service, wherein the trigger message comprises a service identifier indicating the password-protected service.

18. The computer program product of claim 17, wherein the non-transitory computer-readable medium further includes:
  computer code configured to request a password when the zapping includes zapping to the password-protected service.

19. A computer program product, embodied on a non-transitory computer-readable medium, comprising:
  computer code configured to receive a trigger message from a terminal when a zapping includes termination of a password-protected service, wherein the trigger message comprises a service identifier indicating the password-protected service; and
  computer code configured to cause a password to be requested upon detecting a zapping to the password-protected service;
  wherein the trigger message is received from a user terminal application.

20. The apparatus of claim 19, wherein the password-protected service is at least one of a password-protected for parental control and a pincode-protected service.

* * * * *